(12) United States Patent
Aguado et al.

(10) Patent No.: US 10,062,197 B2
(45) Date of Patent: Aug. 28, 2018

(54) ANIMATING A VIRTUAL OBJECT IN A VIRTUAL WORLD

(71) Applicant: NaturalMotion Ltd., Oxford (GB)

(72) Inventors: Alberto Aguado, Aston (GB); James Edward John Brewster, Sidmouth (GB)

(73) Assignee: NaturalMotion Ltd., London (GB)

( * ) Notice: Subject to any disclaimer, the term of this patent is extended or adjusted under 35 U.S.C. 154(b) by 24 days.

(21) Appl. No.: 15/421,852

(22) Filed: Feb. 1, 2017

(65) Prior Publication Data

US 2017/0221250 A1     Aug. 3, 2017

(30) Foreign Application Priority Data

Feb. 1, 2016   (GB) .................................. 1601779.0

(51) Int. Cl.
*G06T 13/00*     (2011.01)
*G06T 13/40*     (2011.01)

(52) U.S. Cl.
CPC .......... *G06T 13/40* (2013.01); *G06T 2213/12* (2013.01)

(58) Field of Classification Search
None
See application file for complete search history.

(56) References Cited

U.S. PATENT DOCUMENTS 6,088,042 A     7/2000   Handelman et al.
2005/0041030 A1   2/2005   Isner
2009/0002376 A1   1/2009   Xu et al.
2010/0259546 A1   10/2010   Yomdin et al.
2017/0042717 A1   2/2017   Agrawal et al.
2017/0221248 A1   8/2017   Aguado et al.

(Continued)

FOREIGN PATENT DOCUMENTS

CN    104851126     8/2015
EP     0827115      3/1998

(Continued)

OTHER PUBLICATIONS

"United Kingdom Application Serial No. 1601790.7, Combined Search and Examination Report dated Jul. 26, 2016", 6 pgs.

(Continued)

*Primary Examiner* — Frank Chen
(74) *Attorney, Agent, or Firm* — Schwegman Lundberg & Woessner, P.A.

(57) ABSTRACT

A computer implemented method for use in animating parts of a virtual object in a virtual world, the method comprising obtaining joint data for each joint of a chain of joints associated with parts of a virtual object, joint data including length data defining a vector length for a vector from the joint to a next joint, the length data corresponding to a length of a part in the virtual world, the joint data for at least one joint including vector constraint data defining a rotational constraint for the vector; accessing data for a target curve defining target locations for the joints of the parts of the virtual object; and processing the joint data to rotate the vector for a joint towards a target location on the curve for a next joint in the chain; and if constraint data for the joint prevents the rotated vector from reaching the target location: set the vector angle for the joint at an angle dependent on the rotational constraint; and rotate an immediately preceding joint in the chain to move the vector for the joint towards the target location on the curve.

15 Claims, 16 Drawing Sheets

(56) References Cited

U.S. PATENT DOCUMENTS

2017/0221249 A1    8/2017    Aguado et al.
2017/0221251 A1    8/2017    Aguado et al.

FOREIGN PATENT DOCUMENTS

| GB | 2546814 | 8/2017 |
| GB | 2546815 | 8/2017 |
| GB | 2546817 | 8/2017 |
| GB | 2546820 | 8/2017 |
| JP | 09237351 | 9/1997 |
| WO | 2006113787 | 10/2006 |

OTHER PUBLICATIONS rz"United Kingdom Application Serial No. 1601790.7, Response filed Feb. 1, 2018 to Combined Search and Examination Report dated Jul. 26, 2016", w/ Amended Claims, 77 pgs.
"U.S. Appl. No. 15/421,779, Non Final Office Action dated Mar. 21, 2018", 25 pgs.
U.S. Appl. No. 15/421,899, filed Feb. 1, 2017, Animating a Virtual Object in a Virtual World.
U.S. Appl. No. 15/421,779, filed Feb. 1, 2017, Animating a Virtual Object in a Virtual World.
U.S. Appl. No. 15/421,818, filed Feb. 1, 2017, Animating a Virtual Object in a Virtual World.
"United Kingdom Application Serial No. 1601779.0, Office Action dated Jul. 26, 2016", 5 pgs.
"United Kingdom Application Serial No. 1601775.8, Office Action dated Jul. 26, 2016", 5 pgs.
"United Kingdom Application Serial No. 1601777.4, Office Action dated Jul. 26, 2016", 5 pgs.

ANIMATING A VIRTUAL OBJECT IN A VIRTUAL WORLD

CLAIM OF PRIORITY

This application claims the benefit of priority to United Kingdom Patent Application Serial No. 1601779.0, filed on Feb. 1, 2016, which is incorporated by reference herein in its entirety.

TECHNICAL FIELD

The invention relates to the technical field of the animation of a virtual object in a virtual world.

BACKGROUND

It is known to author or generate animation for one or more virtual objects (also termed "characters") that are located in a virtual environment (or virtual world), such as a three dimensional virtual environment of a video game or of a visual effects tool. The characters can consist of a hierarchy of joints, or a "rig", that form a skeleton. A skin or mesh may be overlaid (or rendered) on top of the rig to thereby visually represent the character. By updating the location and orientation of the joints (i.e. changing the geometric configuration of the rig), the posture of the character and the position of the character within the virtual world may be updated, i.e. the character may be animated.

One known technique used in the animation of characters is inverse kinematics (IK) animation. This involves: (a) specifying desired target locations and/or orientations for one or more joints of the rig; (b) performing an inverse kinematics operation that determines angles/orientations for the joints of the rig in order to achieve those target locations and/or orientations (e.g. given a target location at which it is desired for a simulated human character to place a foot, the inverse kinematics animation then determines the angles/orientations for the joints of the rig for that character in order to try to achieve a posture for the character such that the foot is then placed at the target location); and (c) setting the angles/orientations for the joints of the rig to the determined angles/orientations.

DETAILED DESCRIPTION

Figure 1:
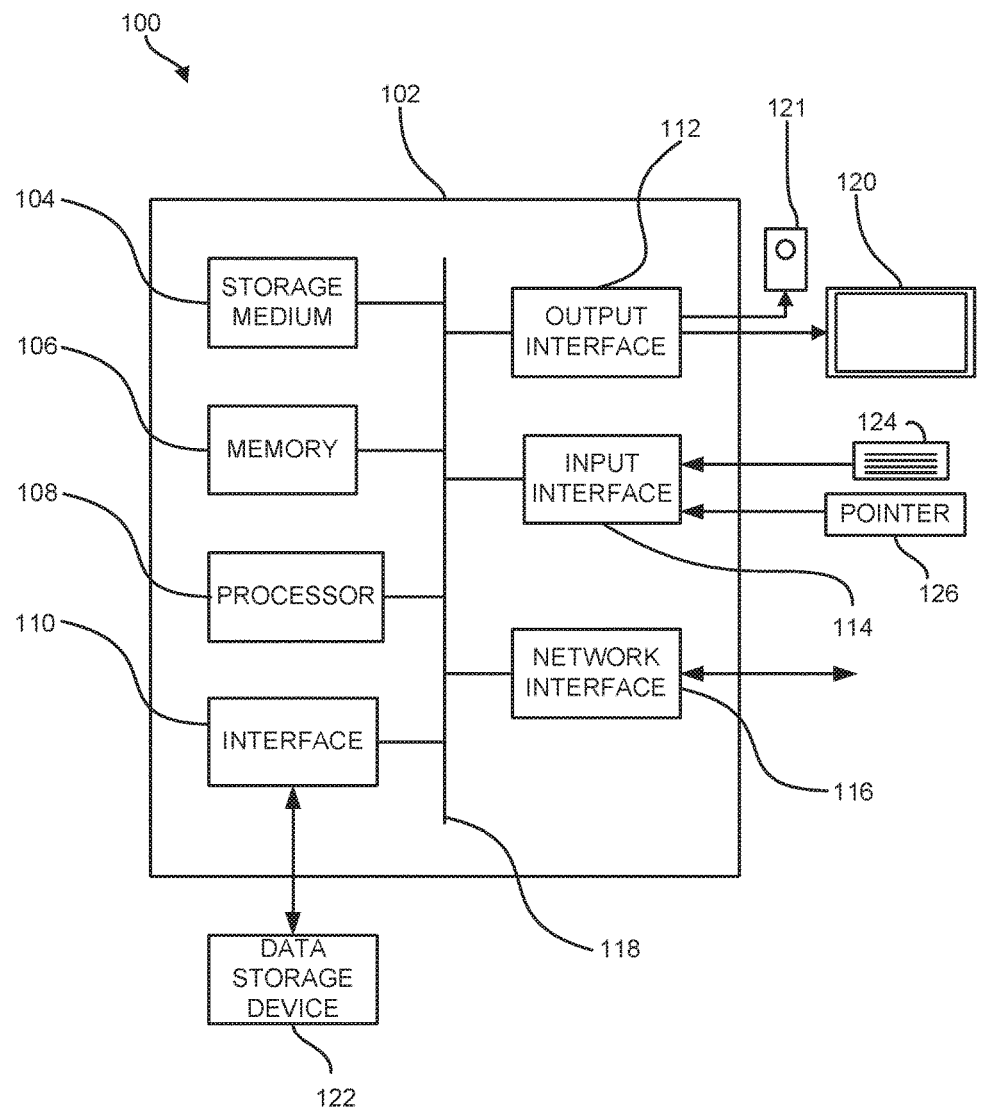
FIG. 1 schematically illustrates an example of a computer system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the following embodiments, like components are labelled with like reference numerals.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Determining the desired locations of complex rigs formed of multiple joints in order to achieve the desired behaviour is complex. One method used to reduce the complexity is curve IK in which the target locations are defined along a curve defined by the animator or by a program such as a game during play. The use of the curve defining a target function to which the joints are to be aligned allows the animator or program to simply define target locations. It also constrains the search to determine the location of the joint locations to the search to fit them to the curve.

A generalized embodiment provides a method and system for use in the animation of parts of a virtual object in a virtual world in which joint data for each joint of a chain of joints associated with parts of a virtual object is obtained. Joint data can represent a current state of a rig which requires the determination of an updated configuration. The joint data includes length data defining a vector length for a vector from the joint to a next joint. The length data corresponds to a length of a part in the virtual world. The joint data for at least one joint includes vector constraint data defining a rotational constraint for the vector. Such constrains can reflect a rotational or angular limitation of a joint in the virtual world. For example, an elbow joint cannot rotate beyond 180 degrees and rotates in a hinged manner, while a shoulder joint can rotate as a ball and socket joint over a large range of angles.

To update the geometric data for the rig, data for a target curve defining target locations for the joints of the parts of the virtual object is accessed, and the joint data is processed. The processing of the joint data causes the rotation of the vector for a joint towards a target location on the target curve for a next joint in the chain and if constraint data for the joint prevents the rotated vector from reaching the target location the vector angle for the joint is set or locked at an angle dependent on the rotational constraint, and an immediately preceding joint in the chain is rotated to move the vector for the joint towards the target location on the curve. The locking of the joint and the rotation of the immediately preceding joint in the chain causes two joint vectors for the two joints to rotate together since the joint vector for the joint is referenced relative to the vector for the immediately preceding joint.

In one embodiment, the setting and rotating are performed recursively to joint data for successively preceding joints in the chain until the vector for the joint reaches the target location on the curve for a next joint in the chain. In other words, the process 'walks' back along the chain of joints trying to rotate the joints so that the target location (the effector for the joint) is reached and 'locking' the joints at their constraints if reached to in effect form a compound vector for the preceding joint to be rotated and the locked joint or joints along the chain.

In one embodiment a combined vector is determined as a vector sum of the vector for the joint and the vector for the immediately preceding joint, a residual angle is determined for the rotation of the combined vector to reach the target location on the curve for the next joint in the chain, and the immediately preceding joint in the chain is rotated by the residual angle to move the vector for the joint towards the target location on the curve.

In another embodiment, a combined vector is determined for a preceding joint in the chain as a vector sum of the vector for the joint, the vector for the preceding joint and vectors for the or each joint between the joint and the preceding joint, a residual angle is determined for the rotation of the combined vector to reach the target location on the curve for the next joint in the chain, and the preceding joint in the chain is rotated by the residual angle to move the vector for the joint towards the target location on the curve.

In one embodiment, the processing of the joint data is performed recursively for each joint along the chain so as to update the geometric data for a component of an object formed of a rig comprising multiple chains of joints or the object if it is only composed of one chain of joints.

In one embodiment, by locking the joints and rotating a preceding joint, the position of the joint, which may be optimally set at an effector on the target curve, will be moved off this optimum position. When multiple joints reach their constraint and are locked, multiple joints may be moved by the rotation of a preceding joint so that their location is no longer at the optimum position on the target curve. The movement of the locked together vectors to move the current joint vector to the target location (the effector for the next joint) can be such that the error in the positioning of the vectors relating to their target locations on the curve (their effectors) is a minimum and shared relatively evenly between the vectors. Thus, the vector of the current joint may not reach the target location and instead be located close to it with an error, which together with the errors in the position of the locked preceding joints is an overall distributed minimum.

Specific embodiments will now be described with reference to the drawings.

System Overview

FIG. 1 schematically illustrates an example of a computer system 100. The system 100 comprises a computer 102. The computer 102 comprises a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments or computer programs that, when executed by the processor 108, cause the processor 108 to carry out a method according to an embodiment and configure the system 100 to be a system according to an embodiment. The processor 108 may comprise a single data processing unit or multiple data processing units operating in parallel, separately or in cooperation with each other. The processor 108, in carrying out data processing operations for embodiments, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data or computer code from and/or upload data or computer code to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments. As examples, the computer system 100 could comprise one or more of: a personal computer; a server computer; a mobile telephone; a tablet; a laptop; a television set; a set top box; a games console; other mobile devices or consumer electronics devices; etc.

Animations and Data for Animations

Figure 2:
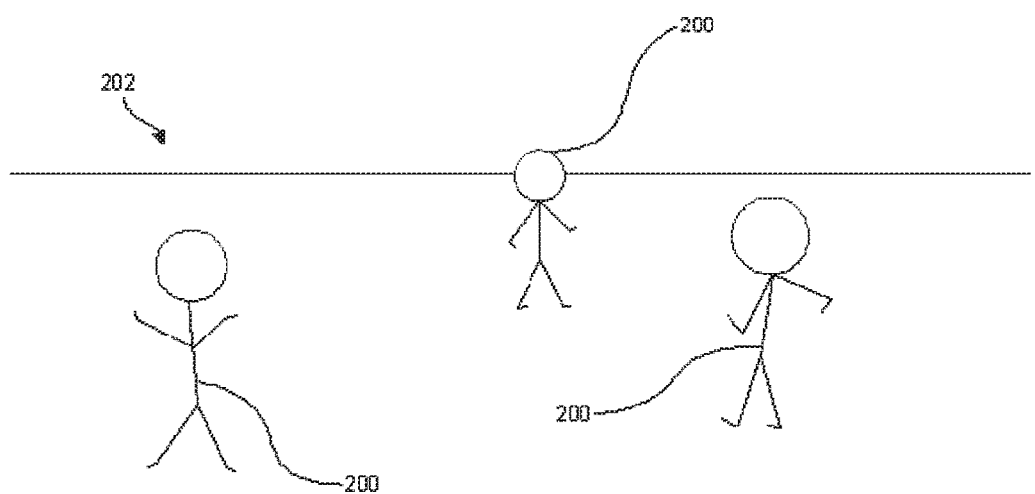
FIG. 2 schematically illustrates example virtual objects within a virtual world.

Embodiments are concerned with animations and, in particular, an animation of a virtual object (or a character) that is located (or resides) within a virtual world (or environment). FIG. 2 schematically illustrates three example virtual objects 200 within a virtual world 202. The virtual objects 200 shown in FIG. 2 (and the rest of this application) represent human beings, but it will be appreciated that embodiments are equally applicable to animations of virtual objects that represent other articles, items, animals, etc. and other types, structures and forms of object that have different intended representations. The virtual world 202 may be any virtual environment, arena or space containing the virtual objects 200 and in which the virtual objects 200 may be moved or animated. Thus, the virtual world 202 may represent a real-world location, a fictitious location, a building, the outdoors, underwater, in the sky, a scenario/location in a game or in a movie, etc. The animation of the virtual object 200 may form a part of a computer game being executed by the processor 108 of the computer system 100, with the animation being generated/computed in real-time. The animation of the virtual object 200 may be generated/computed so as to output a video animation to form part of a film/movie (in which case the generation/computation need not be in real-time). The animation of the virtual object 200 may be generated/computed for other purposes (e.g. computer simulations that involve objects moving and interacting in an environment).

An animation for an object 200 comprises performing an update process at each time point (also referred to as an animation update step) in a series of time points (or a series of animation update steps or update time points). These time-points may correspond to video frames, video fields, or any other time or display frequency of interest—for the rest of this description, the time-points shall be assumed to correspond to video frames, but it will be appreciated that this is only an example and should not be taken as limiting. For example, in some embodiments, one or more animation update steps may be carried out between successive video frames/fields and this number may or may not be constant over time. It will be appreciated that the display frequency (i.e. the frequency at which a display process displays or renders an image of the virtual world 202) need not necessarily be linked to the frequency of performing the update process. The update process performed at the animation update step updates values for attributes of (or associated with) the object 200. These attributes may correspond to, for example, the location and/or orientation of one or more object parts of the object 200 (e.g. the location and/or orientation of the limbs, neck, digits, head, etc. of a human object 200). Thus, in updating the values for the location and/or orientation object attributes, the object 200 is moved within the virtual world 202. However, the attributes associated with the object 200 are not limited to location and/or orientation object attributes, as discussed below.

In the embodiments described below, the animations relate to so-called "skeletal animation", but it will be appreciated that different types or styles of animation fall within the scope of other embodiments. The object attributes for an object 200 may be represented by some or all of the following data (depending on the type of animation and how the object 200 and its attributes are to be represented): (a) topological data; (b) geometric data; (c) trajectory data; (d) skinning data; and (e) rendering data. These data are described in more detail below. It will be appreciated that the object 200 may have attributes in addition to, or as alternatives to, the attributes as described further below with reference to the various data (a)-(e).

Figure 3:
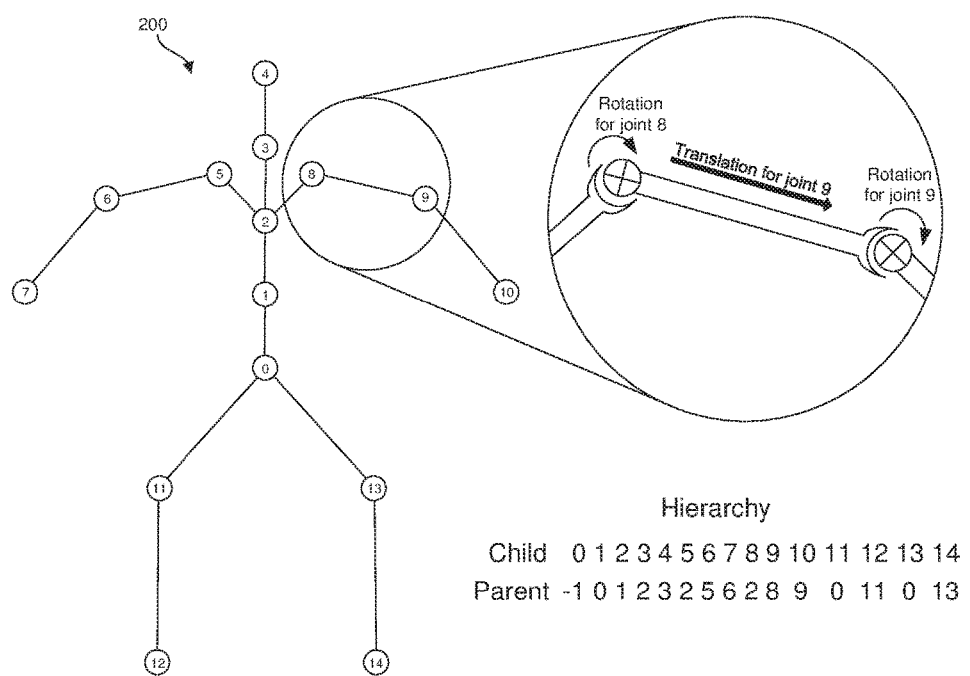
FIG. 3 schematically illustrates an object for an animation according to an embodiment.

FIG. 3 schematically illustrates an object 200 for an animation according to an embodiment. The object 200 comprises a plurality of object sections (or "bones") linked together by respective joints. In FIG. 3, the sections of the object 200 are the straight lines whilst the joints of the object 200 are the numbered circles.

In general, a joint is a (simulated) point or surface or location of contact between two or more object sections so that that joint links (or creates an association between) those sections. In other words, such a joint forms a simulated connection or tie between object sections (in the same way that, for example, a forearm is connected to an upper arm by virtue of an elbow joint). In this way, an object section may have one or more joints associated with it. A joint normally occurs at an end of the object section(s) with which it is associated.

Some joints (such as joint 10 in FIG. 3) occur at the end of an object section, but do not link that section to another section. These joints merely serve to indicate the location of the free (i.e. unconnected) end of that section.

In some embodiments, each object section is "rigid" in that the distance between the joints associated with that section is constant, although, of course, each rigid section may have its own length/distance which may be different from the length/distance for the other rigid sections. However, it will be appreciated that in other embodiments one or more of the sections of the object 200 may not be "rigid".

The object 200 may therefore be considered to comprise a plurality of object parts. In some embodiments, the topological data represents the object 200 as a plurality of joints (i.e. the object parts are just the joints). In some embodiments, the topological data represents the object 200 as a plurality of object sections (i.e. the object parts are just the bones). In some embodiments, the topological data represents the object 200 as a plurality of joints together with a plurality of object sections. The actual representation does not matter for embodiments and therefore in this description the topological data shall represent the object 200 as a plurality of joints and it will be appreciated that the use herein of the term "joint" encompasses both joints and/or bones unless stated otherwise or unless clearly not appropriate. However, the skilled person will appreciate that the following description may be applied analogously to the alternative styles of representation.

The object parts may be considered as forming a skeleton, or framework or "rig", for the object 200.

The object parts (joints in this representation) are linked together, or are associated with each other, in a hierarchy. The hierarchy of joints illustrated in FIG. 3 may be represented by table 1 below:

TABLE 1

| Joint ID | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Parent ID | −1 | 0 | 1 | 2 | 3 | 2 | 5 | 6 | 2 | 8 | 9 | 0 | 11 | 0 | 13 |

In this hierarchy of joints for the object 200, each joint, other than a central, basis root joint (labelled with a joint ID of 0) is a child of another joint in the hierarchy, i.e. every joint other than that root joint is associated with (or linked to) a second joint in the hierarchy (by virtue of a connecting object section), where that second joint is considered to be the parent of that joint. The fact that the central joint is not a child of another joint (and therefore has no parent joint) is represented in table 1 by indicating a parent ID of −1. For example, joint 2 is a child of joint 1 and itself has three children, namely joints 3, 5 and 8. As another example, joint 10 is a child of joint 9, but has no children itself. A joint such as joint 10 that has no child joints (i.e. a joint that is not itself a parent) is included so as to represent a "terminating end" of a section of the object 200, i.e. to indicate the location of the extremities of the object 200. Due to the connecting nature of the object sections that link joints, the movement, position and orientation of a joint in the virtual world 202 is affected by the movement, position and orientation of the parent of that joint in the virtual world 202.

The topological data for the object 200 is data that represents the hierarchy (or hierarchies) or structure of the object parts, i.e. data defining the parent-child relationships between the various object parts that make up the object 200. For example, the topological data for the object 200 may be stored in the form of table 1 above.

The geometric data for the object 200 represents the relative positions and orientations of the object parts. The values given to the geometric data represent the positioning or configuration of the object 200 in a particular posture or stature. In effect, the attributes for the object 200 represented by the geometric data are the length of each object section (bone) together with that bone's orientation relative to its parent bone, i.e. this geometric data represents the distance between a joint and its parent joint, together with the orientation of that joint relative to the parent joint. There are many well-known ways of representing this geometric data, such as: (a) using respective transformation matrices for the joints; (b) using respective pairs of 3×3 rotation matrices and 1×3 translation matrices; or (c) using respective quaternions. As these methods are well-known, and as the particular method used is not important for embodiments, these methods shall not be described in more detail herein. An example representing some of the geometric data for joints 8 and 9 is shown in FIG. 3.

The geometric data for a particular joint is normally defined in a coordinate space local to the parent of that joint (i.e. in which that parent is fixed). Thus, for example, if a "shoulder joint" 8 of FIG. 3 moves but the "elbow joint" 9 of FIG. 3 does not move relative to the shoulder joint, then the geometric data 308 for the elbow joint would not change.

The skinning data is data that enables so-called "skinning" for the animation. The process of skinning is well-known in this field of technology and shall not be described in more detail herein—it takes a definition of the surface of the object 200 and attaches it to the skeleton formed by the object parts (the joints and/or bones). The skinning data is therefore data defining this object surface, which is an attribute of the object 200.

The rendering data is data that enables so-called "rendering" of the animation. The process of rendering is well-known in this field of technology and shall not be described in more detail herein—it actually outputs or displays the skinned surface with relevant textures, colours, lighting, etc. as appropriate. The rendering data is therefore data defining the textures, colours, lighting, etc., which are attributes of the object 200.

Figure 4:
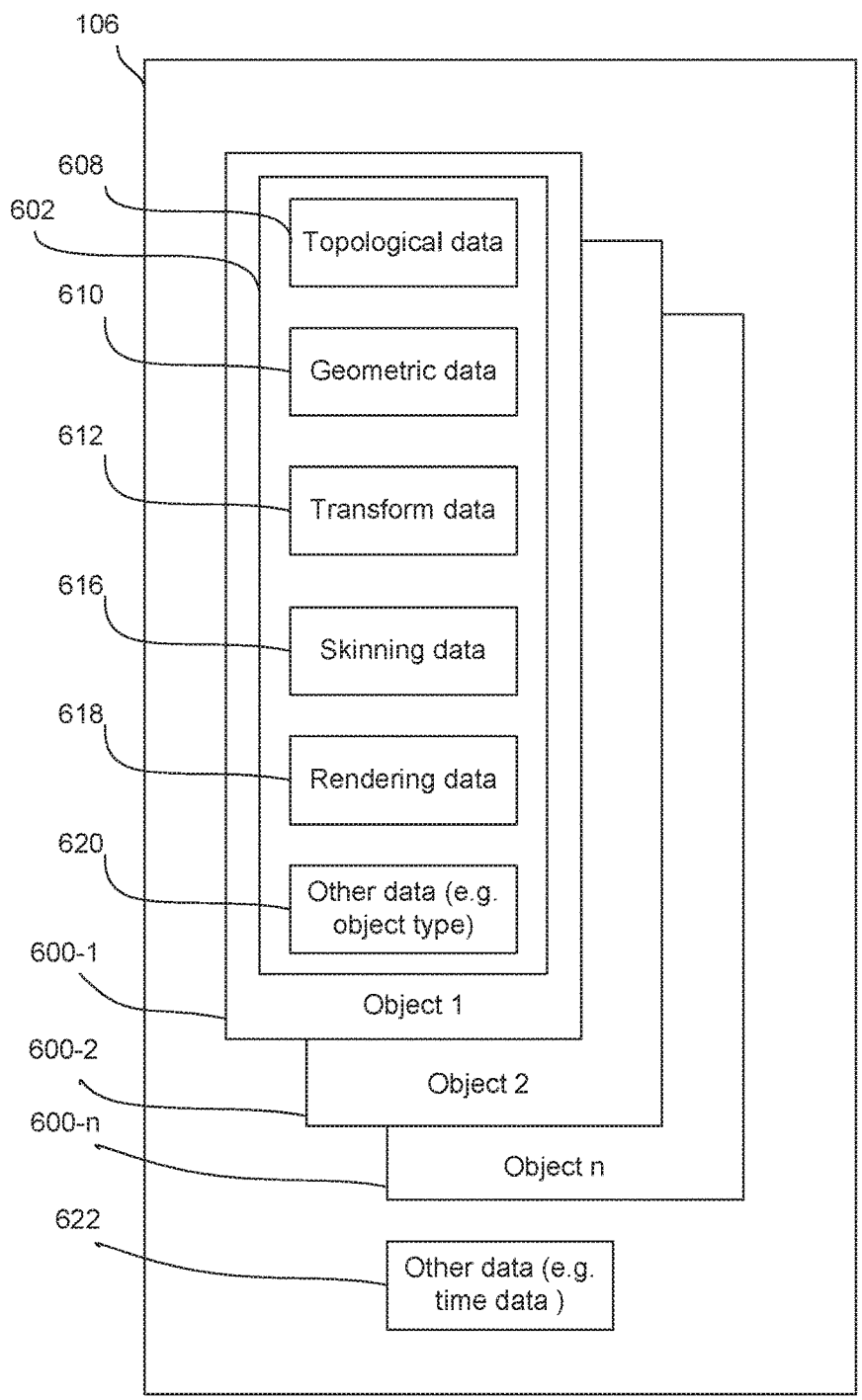
FIG. 4 schematically illustrates some of the data that may be stored in a memory of the computer system of FIG. 1 for embodiments.

FIG. 4 schematically illustrates some of the data that may therefore be stored in the memory 106 (or additionally or alternatively stored in the storage medium 104 or the data storage device 122, or which may be accessible via the network interface 116). There may be respective data 600 for one or more objects 200—in FIG. 4, there are n objects 200, each with their own data 600-1, 600-2, . . . , 600-n. The data 600 for an object 200 may include a set 602 of attribute data for that object 200, including one or more of: topological data 608; geometric data 610; transform data 612; skinning data 616; rendering data 618; and other data 620 specific to that object (e.g. a type of the object 200). There may also be stored other data 622 (such as data defining a time within a computer game or a movie; data defining or describing the virtual world 202; and curve data defining curve types for joint fitting; etc.) which is not specific to any one particular object 200.

Inverse Kinematics and Effectors

"Effectors" and "inverse kinematics" are well-known in this field of technology, but as embodiments relate to the use of effectors and inverse kinematics (referred to herein as IK), they shall be described in more detail below. However, it will be appreciated that the skilled person would be aware of effectors and IK and any known aspects of effectors and inverse kinematics that are not set out below.

An effector is a constraint or target or goal to be achieved by the IK processing. An effector is related to (or associated with, or defined/specified for) a corresponding joint of the object 200. An effector for a joint may represent a desired position and/or orientation for (or associated with) that joint of the object 200 (for example, defined either within the virtual world 202 or relative to the object 200 or relative to that joint). Examples include:

In the animation of an object 200 representing a person moving (e.g. walking) through the virtual world 202, an effector might be specified for a neck joint and/or a head joint of the person which constrains the orientation of the neck and/or head joints so that the head faces in a particular direction, i.e. so that, during the animation, the person appears to be looking at a fixed point within the virtual world 202.

In the animation of an object 200 representing a person, an effector may be specified for a hand joint of the person, where the effector specifies that, during the animation, the hand should be moved to a particular location within the virtual world 202 (e.g. to move towards a simulated button in the virtual world 202 so as to then press that button).

In the animation of an object 200 representing a person, an effector may be specified for a hand joint of the person, where the effector specifies that, during the animation, the hand should point towards another object in the virtual world 202, which may be a moving object (so as to "track" that moving object).

It will be appreciated there are many other types of effector that might be specified for an animation and that the above are provided merely as examples to help demonstrate the notion of an effector.

In one embodiment, each joint of the object 200 is associated with one effector lying at a point along a defined target curve.

It will be appreciated that a curve defining the effectors may be generated dynamically, for example: depending on events that occur during a computer game or animation simulation, or based on commands that are issued by a user (e.g. when a player of a game presses one or more buttons on a game controller to instruct a game character to perform an action).

It is possible to use a IK process to derive (or calculate or determine), for one or more joints of the object 200, a joint angle, so that, when those joint angles are applied to their respective joints, the object 200 will satisfy (or at least try to satisfy) those effectors. IK is well-known in this field of technology (see, for example, http://en.wikipedia.org/wiki/Inverse_kinematics, the entire disclosure of which is incorporated herein by reference). The IK processing results in a set of effectors defining a "solution", where that solution is a set of joint angles for one or more joints of the object 200.

The process of curve IK is a method of defining a curve on which the effectors or targets can be determined using inverse kinematics. The curve defines a function at points along which the effectors lie. The curve comprises a continuous parametric function that provides a position and geometric properties of a continuous line in 3D. Each parameter of the function defines a different position in 3D. In curve IK a continuous curve is defined by control points, namely a start control point defining a start location, and orientation for the curve and the definition of the parametric curve (the curve shape), and an end control point defining the end location of the curve. Intermediate control points may also be defined to enable control of the curve at these points e.g. to enable a twist to be applied to the curve or even to allow complex curve shapes to be defined by concatenating curve shapes (functions).

There are many well-known numerical methods for solving inverse kinematics to calculate joint angles according to a set of effector that lie on the curve. Examples of such numerical methods include cyclic coordinate descendent; step descendent optimization; Jacobian or pseudo-inverse methods; and Lagrange multipliers. It will be appreciated that any method of solving inverse kinematics may be used, including those examples listed.

Figure 5A:
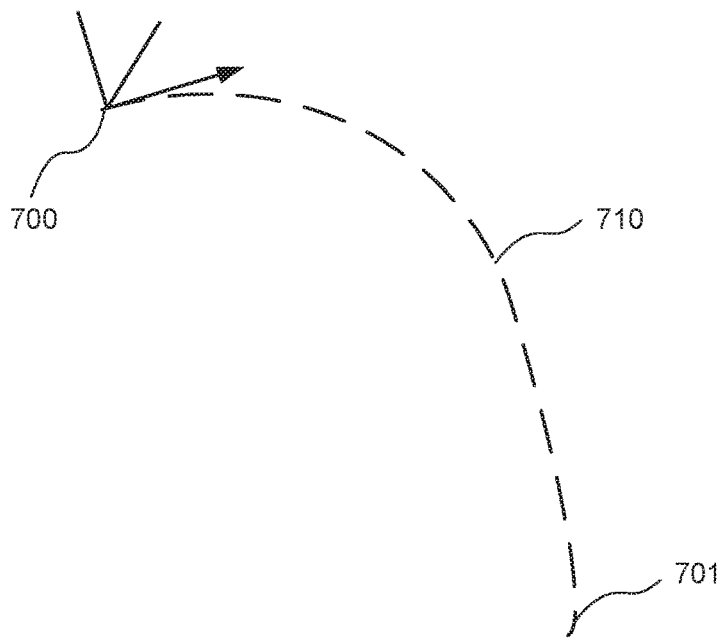
FIGS. 5a to 5g schematically illustrate a process for the fitting of joints for parts of an object to a defined curve.

FIG. 5*a* illustrates a simple form of continuous curve 710 as a three-dimensional function defined by start and end control points 700 and 701: the curve data. The start control point includes parameters defining a start location and curve definition parameters illustrated by a local frame definition at a tangent to the curve. One example of such a frame is the Frenet frame. The frame is a moving frame that provides a coordinate system at each point of the curve that is "best adapted" to the curve near that point. The curve is defined by its curve definition parameters as a mathematical function. The system 100 enables an animator or to select curve values or in a game environment allows a game program to select curve values to define effector locations to which the joints need to be moved. The use of a curve enables a curve IK fitting method to be performed to reduce the search for the solution to the positioning of the effectors by confining the joints to lie along a curve. This simplifies the effector determination process.

The curve 710 can comprise any curve type. Simple curve types such as a sine wave have only start and end control points and parameters defining the function. More complex curve functions such as a Bezier curve have intermediate control points with parameters for each control point defining the curve shape.

Figure 5B:
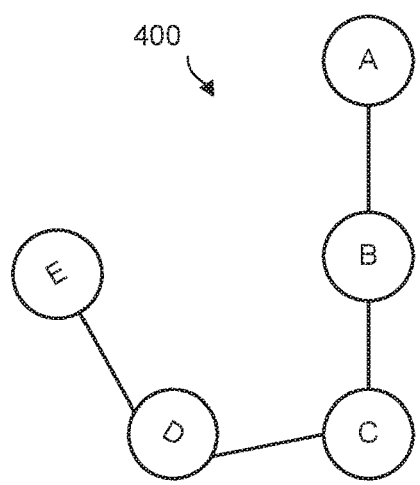
Figure 5C:
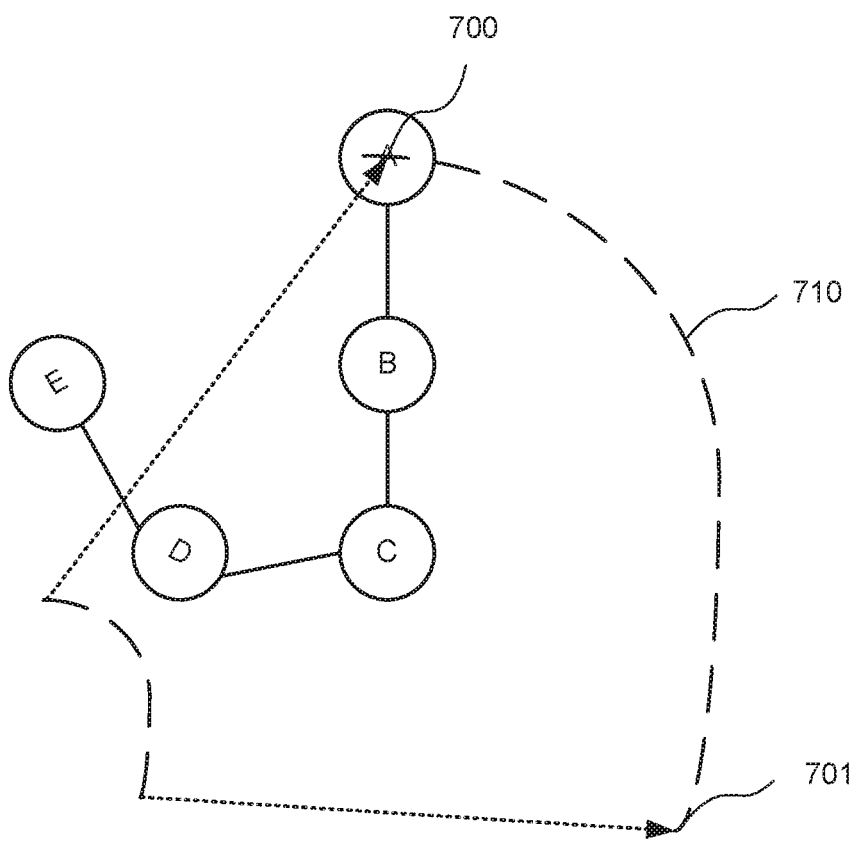
Figure 5D:
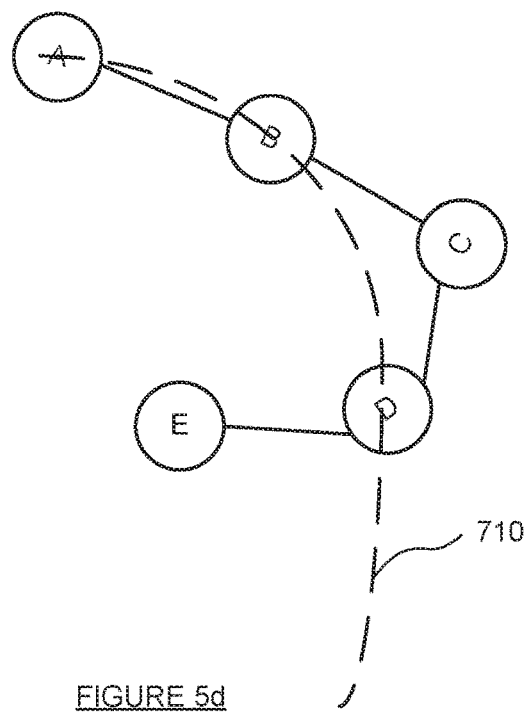
Figure 5E:
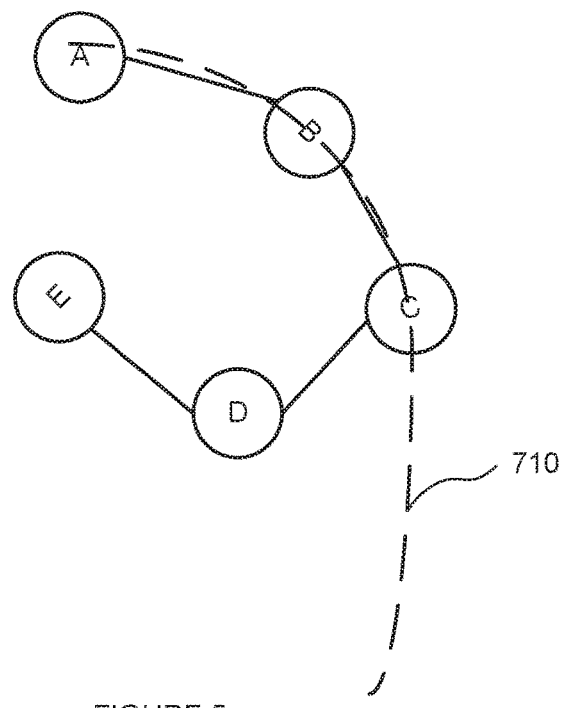
Figure 5F:
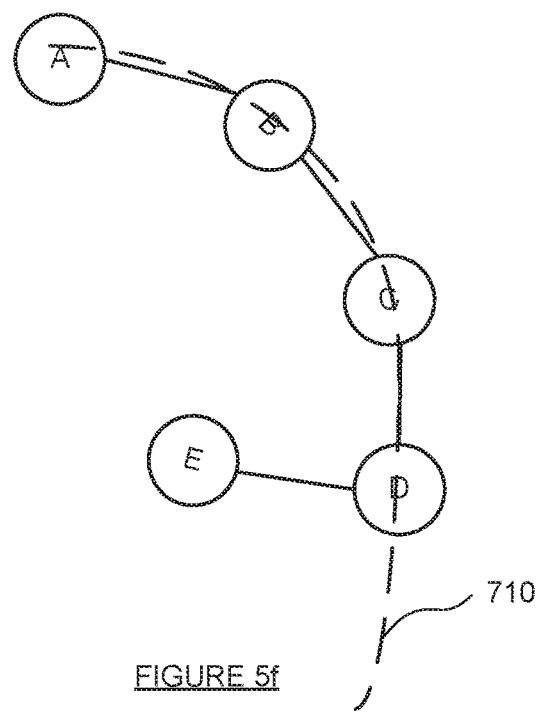
Figure 5G:
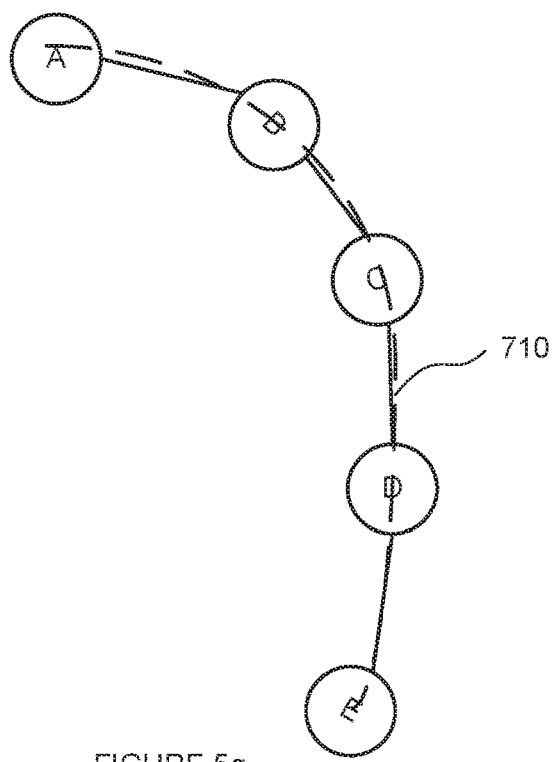

FIG. 5*b* schematically illustrate a rig for a component of an object represented as a chain of five joints A to E. The diagram illustrates an arrangement in 2D. Of course, in a 3D virtual world the rig will represent positions in 3D. The data for each joint A to E defines a current location and a vector length its respective part. The chain is formed by a subset of joints in a rig without bifurcations.

FIGS. 5*c* to 5*g* illustrate a curve IK effector determination process for the fitting of the joints of the rig 400 illustrated in FIG. 5*b* to the curve illustrated in FIG. 5*a*. In FIG. 5*b*, the curve 710 defined by the curve data stored in the system 100 is scaled, if necessary, to ensure that the length of the curve 710 to be used for the determination of the locations for the joints is long enough to fit the joints along. The scaling of the curve is not required if the curve defined by the animator or by the game program is of sufficient length. Further, it may not be always desirable to scale the curve length to be sufficiently long to fit the joints with the least error. In some embodiments, the length of the curve is not scaled and is instead defined by the animator or the game program. This may be to enable the animator or game program to define a location of an end control point that will define a position of an end joint. This may be due to a requirement of the animation environment e.g. a location of a wall through which a character's arm should not protrude. However, in the example illustrated in FIGS. 5*c* to 5*g* the curve 710 is of sufficient length to fit the joints of a series of joints along it. If the curve is not of sufficient length, one option is to fit as many joints to it as the length permits.

As can be seen from the sequence of FIGS. 5*c* to 5*g*, the location of the first joint A in the series is adjusted to the location of the first control point 700. The angle of the vector defined by the joint A is then adjusted to fit the location of joint B to the curve. Then the angle of the vector for joint B is adjusted to fit the location of joint C to the curve. This is repeated for joints D and E until all of the joints lie along the curve 710 or as close to the curve as possible to minimize the error. This process is one example of a curve inverse kinematics process. In this way, as the effectors are defined as points on the curve, the joints can be rotated to define joint data parameters (location and orientation in three dimensions).

The application of curve IK to animate the object 200 may therefore involve updating the position and/or orientation of one or more joints of the object 200 so as to cause a movement of the joints in the virtual world 202 to best fit the curve. Each joint has a local frame defined by the rig. Each effector lying on the curve has a corresponding frame that is matched to the joint frames.

Figure 6:
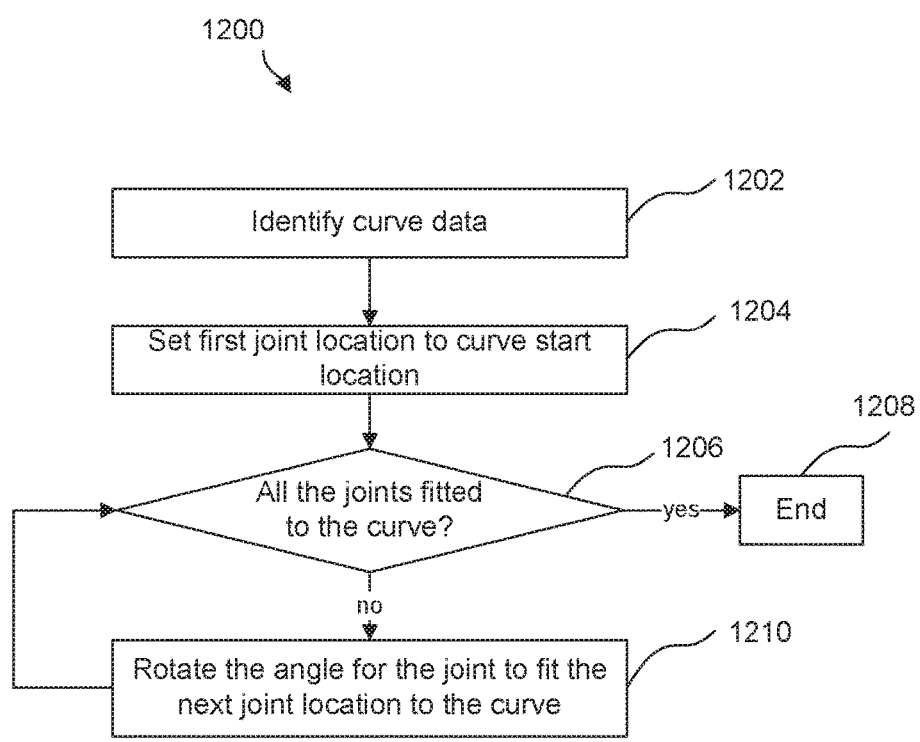
FIG. 6 is a flowchart illustrating the process for the fitting of joints for an object part to a defined curve.

FIG. 6 is a flowchart of the process illustrated in FIGS. 5a to 5g. The flow diagram illustrates processes or steps performed by computer program code in the system 100.

In step 1202 a set of curve data is identified and in step 1204 a first joint in the component of the object is set to the location of the start location of the curve. In step 1206 it is then determined whether all the joints for the component of the object have been fitted to the curve i.e. has the last joint (the end joint) been fitted to the curve. If so, the process ends at step 1208. If not, in step 1210 the orientation of the current joint (the vector angle for the joint) is rotated until the next joint in the series of joints is located on the curve or fitted to the curve. The process then returns to step 1206 to process the next joint in the series. This process repeats until all of the joints are fitted to the curve and the process terminates at step 1208. This process is repeated for each component of the object to update all the joint locations for the object.

In the process illustrated in FIGS. 5a to 5g and 6, it is assumed that the joints are free to move as required in order to fit along the curve. However, for many animated objects, constraints are set for the rotations of the joints. Such constraints are stored as constraint parameters for the joint and can be stored as part of the geometric data 610 for the object. Examples of constrained joints are:
- An elbow joint, which is constrained to move as a hinge joint with a range of angles in a 2D plane of a few degrees to 180 degrees
- A shoulder joint that has less constraints on its rotation and can move as a ball and socket joint to rotate in 3D over a range of something like 270 degrees of solid angle FIGS. 7a to 7e illustrate a process for the fitting of a vector for a joint in a chain of joints A, B and C to an effector X comprising a target location on a curve for a next joint, in which a constraint on the rotation of the joint is taken into consideration.

Figure 7A:
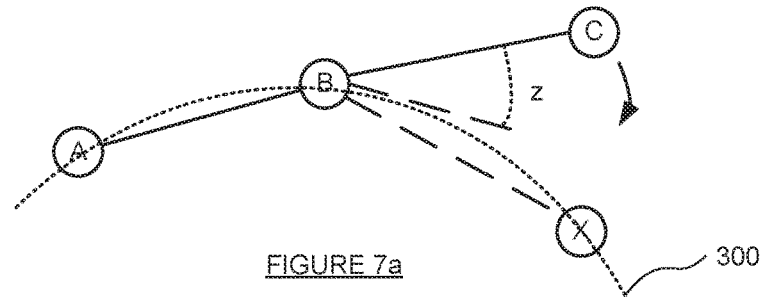
FIGS. 7a to 7e schematically illustrate the process for the fitting of a joint for a part of an object to a defined curve according to one embodiment.

As shown in FIG. 7a, a current joint to be processed (rotated) B has a vector pointing to a current location of the next vector C. An effector X is defined to lie on a curve 300 and comprises the desired location of the next joint C. Joint B has constraint data defining a rotational constraint in the direction of the effector X indicated by the angle z. This angle is less than the required rotational angle for the vector for the current joint B to locate the next joint C at the effector.

Figure 7B:
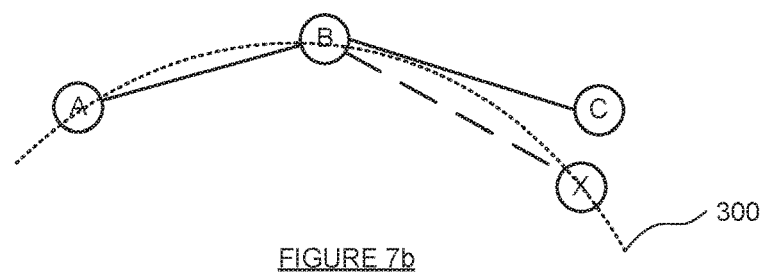
Figure 7C:
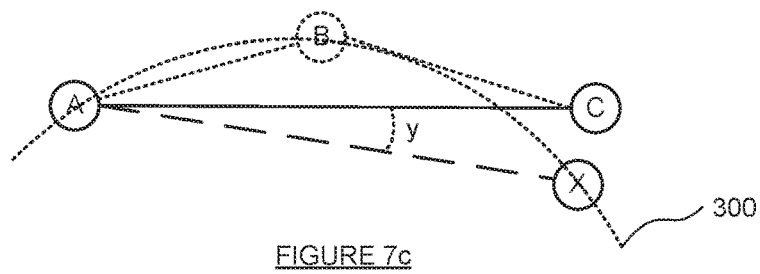
Figure 7D:
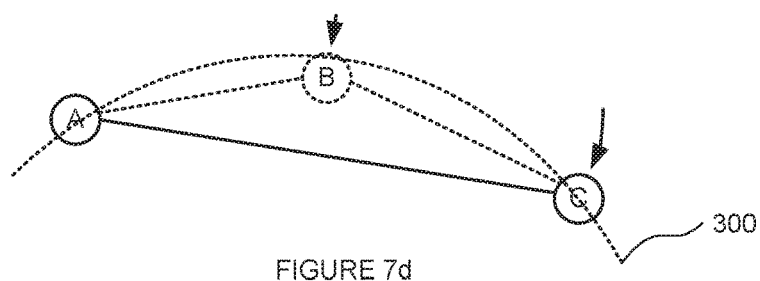
Figure 7E:
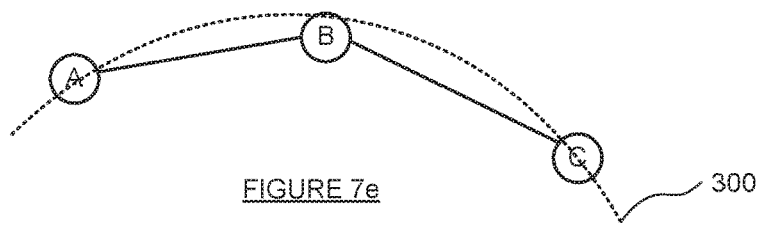

As shown in FIG. 7b, the process rotates the vector for the current joint B to its limit defined by the constraint. Then the joint vector is set or locked at this angle and the process recurses to an immediately preceding joint A linked by the vector for joint A to the location of vector B. A combined vector for the two joints is determined as a vector combination or sum of the vector for the current joint B and the vector for the immediately preceding joint A as shown in FIG. 7c. A required angle of rotation y is determined for this combines vector based on the error in the location of the next joint C in the chain. The vector for the immediately preceding vector A is rotated by the determined angle to move the location of the next vector C defined by the end of the vector for the current joint B to the effector X located on the curve 300 as shown in FIG. 7d. The vector angle of the current vector B is fixed or locked relative to the angle of the immediately preceding vector and as shown in FIG. 7d as a result of the rotation of the vector for the immediately preceding joint A, the location of joint B moves slightly off the curve 300 and the location of the next vector C moves a relatively greater distance to the location on the curve of the effector X. FIG. 7e illustrates the final location of the joints and the final angles of the vectors for the joints.

It can be seen in FIG. 7e that the current joint B ends up slightly moved from its effector location on the target curve 300. This is required in order to enable the next joint C to lie on or closer to the effector position X on the target curve 300. Although in FIGS. 7d and 7e it is shown that the vector for the immediately preceding joint A is rotated so that the next joint C lies at the effector location X on the target curve 300, in one embodiment, it can be rotated slightly less to reduce the error caused by the movement of the location of the current vector B from the curve. The rotation of the vector for the immediately preceding joint A can be set to achieve a minimum in the average error for the locations of joints B and C so that the error in the locations of the joints B and C is shared between them with an overall minimum.

FIGS. 7a to 7e illustrate the process when the rotational constraint of the vector of the current joint can be met by rotating the immediately vector for the immediately preceding joint.

FIGS. 8a to 8f illustrate the recursion of the process back along the chain of joints when the vector for the immediately preceding joint is constrained and cannot be rotated to accommodate the full error in the location of the next joint. FIGS. 8a to 8f illustrate the recursion of the process along two preceding joints of the chain in order to rotate the vector for the current joint to position the next joint close to or at the effector location 301 on the curve 300.

Figure 8A:
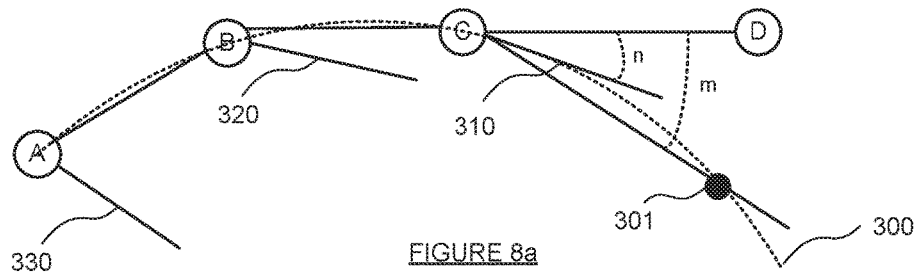
FIGS. 8a to 8f schematically illustrate a recursive process for the fitting of joints for parts of an object to a defined curve according to one embodiment.

As shown in FIG. 8a, a rig for a component of an object comprises a chain of four joints A, B, C and D. The current joint being processed is joint C. The preceding joints A and B have been processed to lie along the target curve 300 at effector locations (not shown). The processing of the current joint C requires the rotation of the vector for the current joint C to position joint D on the curve 300 at an effector location 301. However, joint C has rotational constraints indicated by the vector 310 to confine the possible rotation of the vector for joint C to the angle n, which is less than the required angle m.

Figure 8B:
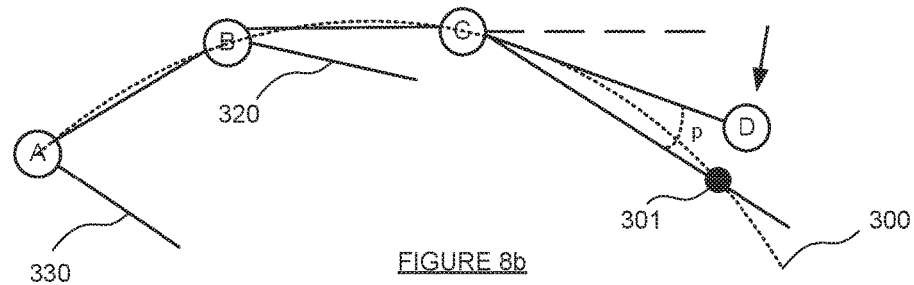
Figure 8C:
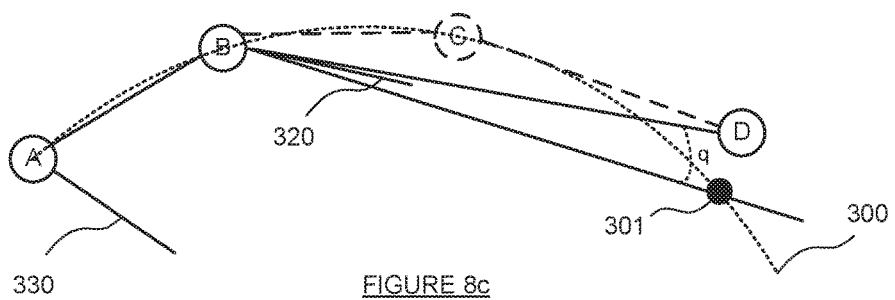
Figure 8D:
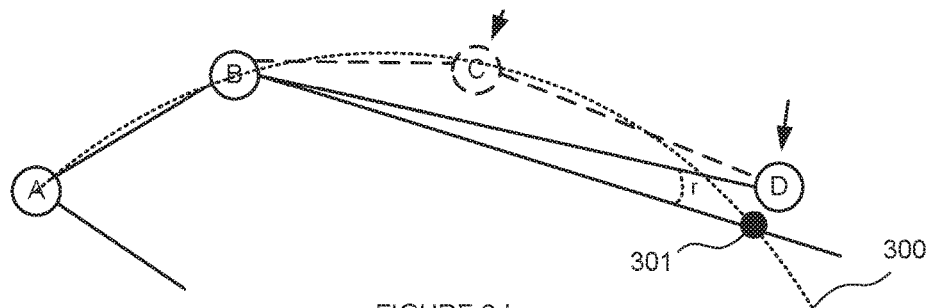

As shown in FIG. 8b, the vector for the current joint C is rotated to its limit defined by the constraints for the joint. A residual angle p remains to position the next vector at the effector 301. As shown in FIG. 8c, the rotation of joint C is locked at the limit angle defined by the constraint data for the joint and a compound vector is determined from an immediately preceding joint B to the location of the next joint D. A desired angle for the rotation of the compound vector to move the next joint D to the effector position 301 is determined. However, the vector for the immediately preceding joint B has a rotational limit defined in constraint data for the joint and illustrated as vector 320 in FIG. 8c which is less than the desired angle. Hence, the vector for the immediately preceding joint B is rotated to its limit as shown in FIG. 8d to leave a residual angle r determined from the error in the location of the next joint D relative to the effector 301 for the current joint C. This is the same process as illustrated in FIG. 7d. However, in this embodiment, the target location is not reached due to the constraints on the vector rotation of the joint B.

Figure 8E:
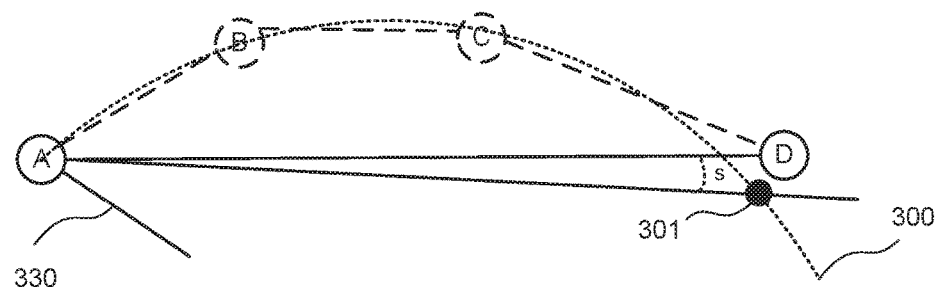

The process recurses back to a further preceding joint A and the rotational angle of the vector of joint B is fixed or locked relative to the vector for joint A. As shown in FIG. 8e a compound vector is determined from the preceding joint A to the location of the next joint D. A desired angle s for the rotation of the compound vector to move the next joint D to the effector position 301 is determined. It can be seen in FIG. 8e that joint A has constraint data defining a vector rotation limit indicated by vector 330 which will allow the rotation of the vector for joint A to accommodate the desires angle s. Hence, as shown in FIG. 8*f*, the vector for the preceding joint A is rotated to move the end of the vector for the current joint C (i.e. the location of the next joint D) to the location of the effector 301.

Figure 8F:
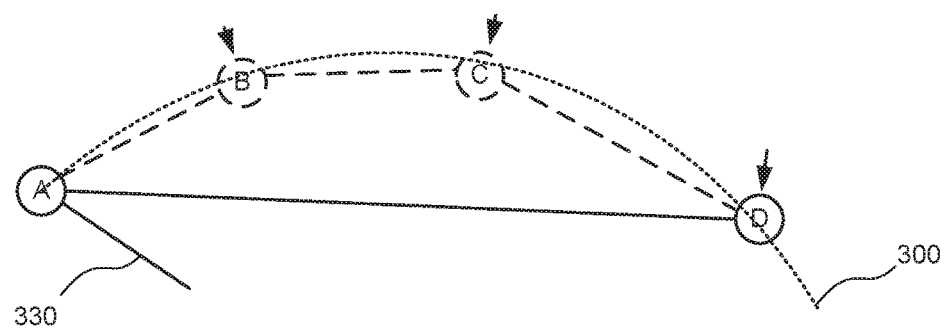

It can be seen in FIG. 8*f* that the current joint C and the immediately preceding joint B end up slightly moved from their effector locations on the target curve 300. This is required in order to enable the next joint D to lie on or closer to the effector position 301 on the target curve 300. Although in FIGS. 8*a* to 8*f* it is shown that the vector for the immediately preceding joint B and the further preceding joint A are rotated so that the next joint D lies at the effector location 301 on the target curve 300, in one embodiment, it can be rotated slightly less to reduce the error caused by the movement of the locations of the current joint C and the immediately preceding joint B from the curve 300. The rotation of the vector for the immediately preceding joint B and the further preceding joint A can be set to achieve a minimum in the average error for the locations of joints B, C and D so that the error in the locations of the joints B, C and D is shared between them with an overall minimum.

Figure 9:
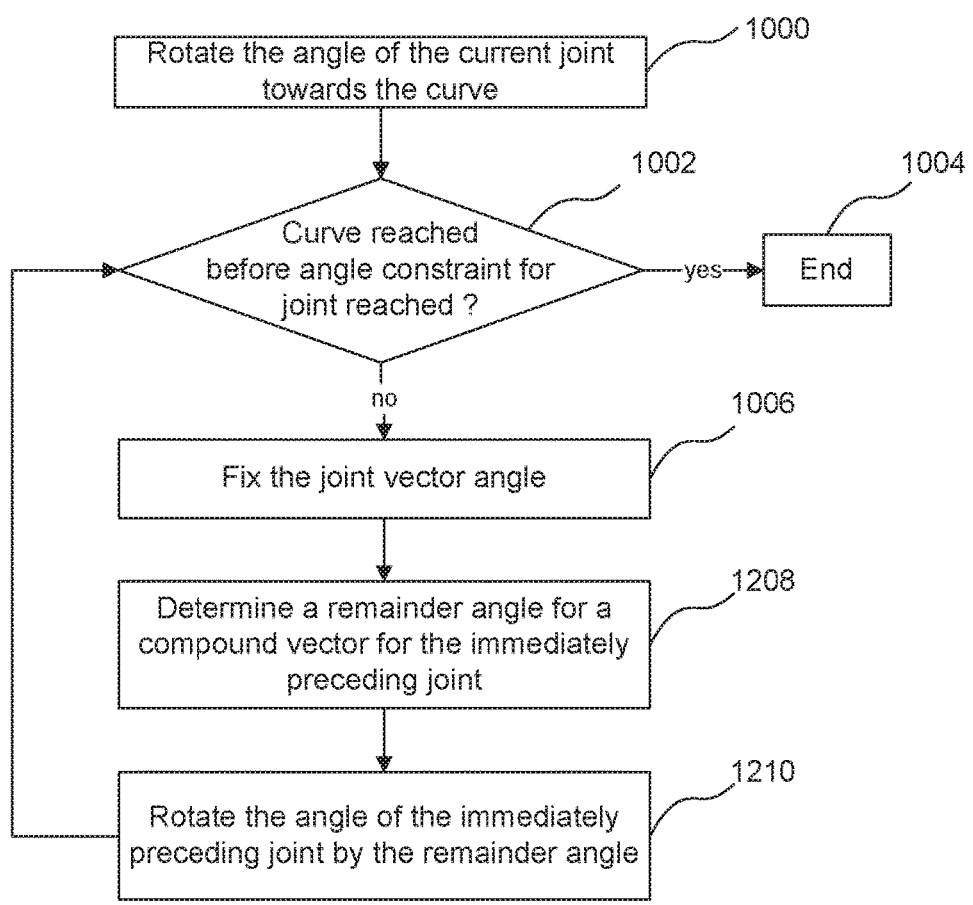
FIG. 9 is a flowchart illustrating a method for fitting joints for parts of an object to a defined curve according to one embodiment.

FIG. 9 is a flow diagram illustrating the process illustrated in FIGS. 7*a* to 7*e* and 8*a* to 8*f* and performed by software.

Joint data for the joints is obtained from data stored for the current configuration of the rig. The process illustrated in the flow diagram represents the process for a single joint.

In step 1000 the angle of the vector for the current joint is rotated towards the target location on the curve (the effector). If the vector can be rotated to reach the curve without reaching a constraint (step S1002), the processing for the joint is complete and the process ends in step 1004.

If the vector for the joint reaches a constraint for the joint before reaching the curve (step 1002), the joint vector angle for the joint is fixed or locked in step 1006. A remainder angle for a compound vector from the immediately preceding curve is determined in step 1008. The compound vector is a vector sum of the vector for the current joint and the vector for the immediately preceding joint. The remainder angle is determined as an angle to rotate the compound vector to reach the target location on the curve. In step 1201, the angle of the vector for the immediately preceding joint is rotated by the remainder angle to rotate the locked vector for the current joint towards the target location on the curve (the effector location). The process then returns to step 1002 to determine if the target location on the curve has been reached before an angle constraint for the joint has been reached. If so, the process ends at step 1004. If not the process of steps 1006, 1008 and 1010 recurses for a further preceding joint and repeats this recursion for as many preceding joints as is required to fit the vector for the current joint to the curve.

Behaviours and Inverse Kinematics

Figure 10:
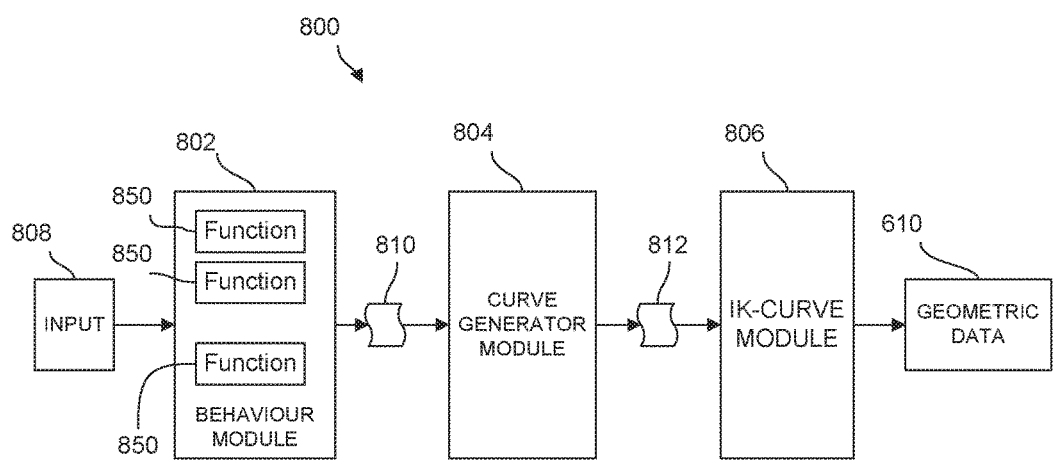
FIG. 10 schematically illustrates an example system for animating a virtual object according an embodiment.

FIG. 10 schematically illustrates an example system 800 for animating a virtual object 200, according an embodiment. The system 800 may, for example, be implemented as one or more computer programs (or one or more software modules) and may, therefore, be executed by the processor 108 of the system 100 of FIG. 1.

The virtual world 202 may comprise a plurality of objects 200, and each object 200 may have its own corresponding system 800 implemented in order to animate that object 200. Alternatively, a system 800 may be used to animate a plurality of objects 200 (e.g. by sequentially or successively updating the configuration for a plurality of objects at an animation update step, or performing such updates in parallel for the plurality of objects). The description below therefore sets out how the system 800 may be used to animate a specific object 200 (with the same operations potentially being performed for other objects 200 in the virtual world 202).

The system 800 comprises a behaviour module 802, a curve generator module 804 and an IK-curve module 806. In summary, the behaviour module 802 is arranged to receive a set of one or more input parameters 808 (or data or information) and to determine, from this set of input parameters 808, behaviour data 810 for a virtual object 200. As shall become apparent, the behaviour data 810 specifies (or defines) one or more behaviour parameters that enable the curve generator module 804 to generate a curve suitable for controlling the required position of joints for parts of the object 200. The behaviour data 810 is output from the behaviour module 802 and is received (or obtained/accessed) by the curve generator module 804. The curve generator module 804 is arranged to use the behaviour data 810 to generate curve data 812—the curve data 812 specifies (or defines) a control function on which the effectors are located for the fitting of the joints to cause the joints to achieve the desired positions. The curve data 812 can be stored as part of the data in memory 106 and is output from the curve generator module 804 to be received (or obtained/accessed) by the IK-curve module 806. The IK-curve module 806 then uses the curve control function specified by the curve data 812 to perform IK processing to determine the joint positions to define the angles for joints of the component of the object 200, i.e. to update the geometric data 610 for the component of the object 200 (as has been discussed above) using the process described with reference to FIGS. 5*a* to 5*g*, and FIG. 6.

Each parameter in the set of one or more input parameters 808 may be an amount of data or a value representing a quantity intended to influence or control the behaviour (or animation or movement) of the object 200 for a next animation update step of the animation. The set of input parameters 808 may, therefore, include one or more parameters that are one or more of:

Inputs from a user (or some other controller of a game or animation tool). For example, the user inputs may identify a desired movement of the object 200, potentially including one or more properties of the movement such as a direction in which the object 200 is to move, a style in which the object 200 is to move, etc. (e.g. "move left", "crouch", "run at 70% of maximum running speed", etc.).

One or more predetermined inputs (such as default animation data for the object 200).

Data indicating how the object 200 has interacted with the virtual environment 202. This data could include, for example, an indication that a part of the object 200 has collided, or made contact, with a part of its virtual world 202 (e.g. another object within the virtual world 202), or that the object 200 is approaching another object within the virtual world 202 (with the intention then being that the object 200 should then be animated to take an evasive or protective manoeuvre).

Other data or information about the state of the object 200 and/or the virtual world 202.

The behaviour module 802 comprises, or is arranged to execute, one or more predetermined functions 850. The predetermined functions 850 may each make use of one or more of the parameters from the set of input parameters 808 to influence how the object 200 is to be animated. The behaviour module 802 uses the outputs of the predetermined functions 850 to determine behaviour data 810 for the object 200.

The predetermined functions 850 may be viewed as "abilities" or "tasks" for the object 200. For example one or more of the following may be implemented for the behaviour module 802:

One predetermined function 850 may be arranged to try to control the object 200 so as to simulate how the object 200 would respond to being "wounded" (for example when the input parameters 808 indicate that the object 200 has been wounded). This may be achieved by setting a behaviour (as specified in the behaviour data 810) for an arm so that a hand joint at the end of the arm will be moved to cover, or be located at, the wound.

Another predetermined function 850 may be arranged to control the object 200 so as to try to cause the object 200 to remain in a balanced posture, for example by setting a behaviour (as specified in the behaviour data 810) for one or more feet joints of the object 200. Such a function may make use of input parameters 808 that specify the nature of the surface on which the object 200 is positioned, together with input parameters 808 specifying other influences that may be acting on the object 200.

Another predetermined function 850 could be arranged to control the object 200 to simulate the object 200 defending itself from an attack, such as by setting a behaviour (as specified in the behaviour data 810) for an arm or leg to move joints of that arm or leg to block or repel another object in the virtual world 202.

Another predetermined function 850 could be arranged to set a behaviour (as specified in the behaviour data 810) for a head of the object 200 to control a joint for the head so that the head remains oriented and facing towards a particular point or object within the virtual world 202.

Another predetermined function 850 could be to control the object 200 to simulate the character walking, running, or performing some other predetermined movement, by setting one or more behaviours (as specified in the behaviour data 810) for corresponding parts of the object 200.

Another predetermined function 850 could be to control the object 200 to perform a predetermined interaction with another object in the virtual world 202 (such as pressing a button or picking up an object), by setting one or more behaviours (as specified in the behaviour data 810) for corresponding parts of the object 200.

Another predetermined function 850 could be to control the object 200 to collide with another object in the virtual world 202 in a particular manner, by setting one or more behaviours (as specified in the behaviour data 810) for corresponding parts of the object 200, such as by specifying a target location and a target velocity for the collision for one or more parts of the object 200.

Other abilities may, of course, be provided for by other predetermined functions 850. Indeed, the behaviour module 802 may be arranged to receive, as an input, animation data for (or defining) a predetermined animation (e.g. a "walk" animation or a "run" animation), and the behaviour module 802, or one of its predetermined functions 850, may be arranged to pass this animation (in the form of behaviour data 810) to the curve generator module 804.

Some of the predetermined functions 850 may be specific to a subset of joints or bones of the object 200, thereby outputting behaviour data just in relation to those specific joints or bones; other predetermined functions 850 may determine behaviour data for the whole object 200.

At any given animation update step, a predetermined function 850 may generate new behaviour data to specify one or more behaviours for the object 200, or may not generate new behaviour data. For example, if a predetermined function 850 is arranged to try to control the object 200 so as to simulate how the object 200 would respond to being "wounded" (for example when the input parameters 808 indicate that the object 200 has been wounded), then that predetermined function 850 may generate and output new behaviour data if the input parameters 808 change to indicate that the object 200 has been wounded, whereas it might not generate and output new behaviour data if the input parameters do not change to indicate that the object 200 has been wounded. Thus, at any given animation update step, the behaviour module 802 may generate new behaviour data 810 to specify one or more behaviours for the object 200, or may not generate new behaviour data 810.

By making use of individual predetermined functions 850, the behaviour module 802 is made modular, which makes it easier to add and extend different aspects of character behaviour. For example, if a new ability for the object 200 is to be implemented, such as an ability to point a hand (at the end of an arm limb) at a location or object within the virtual world 202, then a new predetermined function 850 for that ability may be created (in isolation) and added to the behaviour module 802 without affecting the already-existing predetermined functions 850. It will be appreciated, however, that the behaviour module 802 may be implemented itself as a single predetermined function 850 (albeit perhaps more complex and involved than the more modular approach set out above).

The behaviour module 802 takes the outputs from each predetermined function 850 and generates, or determines, the behaviour data 810 for the object 200. Some of the predetermined functions 850 may each wish to control how a particular joint or bone is to be controlled or moved. For example, if the set of input parameters 808 indicates that the object 200 has received a wound and is also being attacked, then one of the predetermined functions 850 that responds to the object 200 being "wounded" may wish to move a hand joint to cover the wound, whilst another one of the predetermined functions 850 that responds to the object 200 being "attacked" may wish to move that same hand joint so as to defend the object 200 from the attack. The behaviour module 802 may arbitrate between the outputs of multiple predetermined functions 850 in order to generate the output behaviour data 810. This arbitration can be achieved in any suitable way, such as: by forming the behaviour data 810 using a weighted combination of the individual configurations/targets output by each of the predetermined functions 850; by ignoring individual configurations/targets output by some of the predetermined functions 850 (in preference of individual configurations/targets output by other predetermined functions 850) in certain circumstances, etc.

Hence, the output from the behaviour module 802 comprises behaviour data 810 for the object 200. The behaviour data 810 may take many different forms. In general, though, the behaviour data 810 specifies, or defines, for one or more object parts (e.g. joints) of the object 200, a corresponding behaviour. Thus, the behaviour data 810 may comprise, one or more behaviour parameters that define or specify that behaviour.

Figure 11:
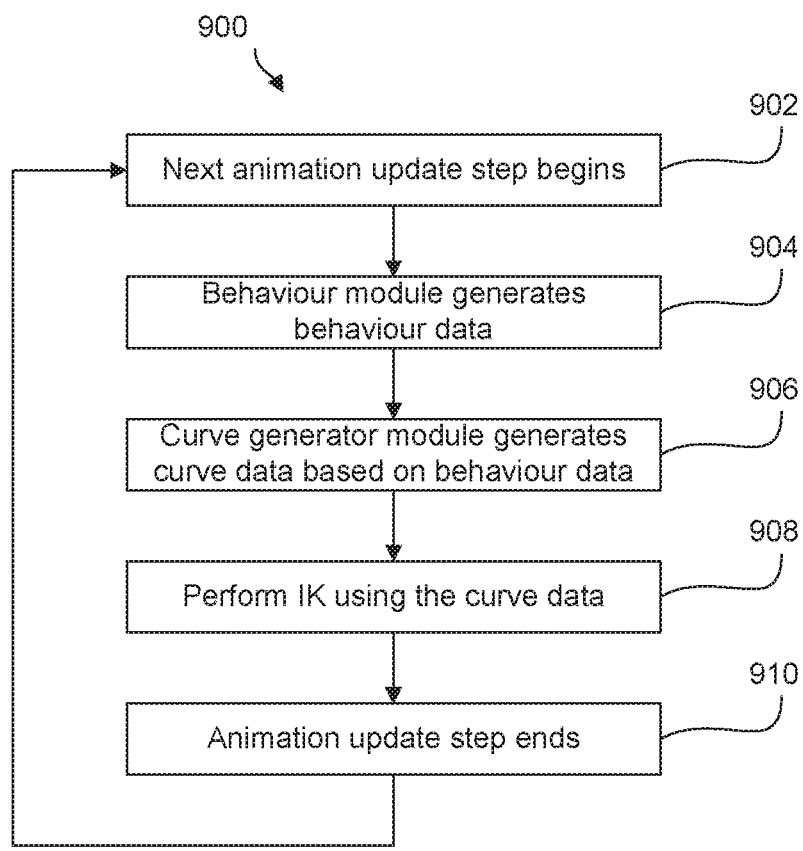
FIG. 11 is a flowchart illustrating a method for animating an object using the system of FIG. 10 according to an embodiment.

FIG. 11 is a flowchart illustrating a method 900 for animating an object 200 using the system 800 of FIG. 10 according to an embodiment.

At a step 902, a next animation update step (in the sequence/series of animation update steps) begins. This "next" animation update step is then the "current" animation update step.

At an optional step 904, the behaviour module 802 generates and outputs (or updates) the behaviour data 810. For example, the behaviour module 802 may be arranged to generate (or determine) and output the behaviour data 810 at each animation update step based on the current set of input parameters 808. However, this step 904 is optional because the behaviour module 802 may be arranged to generate and output (or update) the behaviour data 810 at an animation update step only if there has been a change to the set of input parameters 808 since the preceding animation update step (in which case, the behaviour module 802 may be arranged to detect or determine whether there has been a change to the set of input parameters 808 for the current animation update step relative to the immediately preceding animation update step).

The actual generation of the behaviour data 810 based on input parameters 808 that the behaviour module 802 receives (or accesses/obtains) has been described above.

The behaviour module 802 may store the behaviour data 810, for example as part of the data 620 for the object 200—thus, if the behaviour module 802 generates new behaviour data 810 at the current animation update step, then that new behaviour data 810 is available as part of the data 620, whereas if the behaviour module 802 does not generate new behaviour data 810 at the current animation update step, then previously generated behaviour data 810 is available as part of the data 620. Additionally, or alternatively, the behaviour module 802 may provide the behaviour data 810 to the curve generator module 804 (either at each animation update step, regardless of whether new behaviour data 810 has been generated at the current animation update step, or only at an animation update step at which new behaviour data 810 has been generated).

At a step 906, the curve generator module 804 receives (or obtains/accesses) the behaviour data 810. As set out above, the curve generator module 804 may receive the behaviour data 810 directly from the behaviour module 802 (potentially at each animation update step or only at an animation update step at which new behaviour data 810 has been generated by the behaviour module 802). Alternatively, the curve generator module 804 may access stored behaviour data 810 (e.g. from the data 620).

As mentioned above, the behaviour data 810 specifies (or defines), for one or more object parts of the object 200, a corresponding behaviour. At the step 906, for each of these one or more object parts for which a behaviour has been defined, the curve generator module 804 generates a curve defining a control function based on the behaviour data.

Thus, the curve generator module 804 generates the curve data 812 at the step 906. The curve generator module 804 may store the curve data 812, for example as part of the data 620 for the object 200. Additionally, or alternatively, the curve generator module 804 may provide the curve data 812 to the IK-curve module 806.

At a step 908, the IK-curve module 806 receives (or obtains/accesses) the curve data 812. As set out above, the IK-curve module 806 may receive the curve data 812 directly from the curve generator module 804. Alternatively, the IK-curve module 806 may access stored curve data 812 (e.g. from the data 620).

At the step 908, the IK-curve module 806 performs a curve IK operation, based on the curve data determined for each of the one of more object parts for which the behaviour data 810 specified a behaviour. The IK-curve module 806 uses the curve control function specified by the curve data 812 to perform IK curve processing to determine the effector positions and hence the locations and angles for joints of the component of the object 200, i.e. to update the geometric data 610 for the object 200 (as has been discussed above) using the process described with reference to FIGS. 5*a* to 5*g*, and FIG. 6. This curve IK operation updates a configuration for the effectors associated with the object parts of the object 200 and updates the position and orientation of the object parts, i.e. the curve IK operation updates the geometric data 610 for the object 200.

At a step 910, the current animation update step ends. This may involve, for example, rendering an image representing the updated configuration of the object 200 (e.g. to depict the animation of the object 200 on the screen 120) and/or saving (or storing) data indicative of the update to the geometric data 610 for the object 200 (so that an animation of the object 200 can be rendered at a later point in time based on this stored data). Other processing may be performed (e.g. to update other data 622 for a game involving the object 200, the update being based on the updated configuration for the object 200, such as scoring game points or losing game lives or proceeding to a next stage in the game, etc).

Processing may then return to the step 902 in order to perform a further animation update step in the sequence of animation update steps.

Thus, the system 800 will determine, for one or more object parts of the object 200, a corresponding behaviour and, at each animation update step of a sequence of one or more animation update steps: for each of the one or more object parts, perform a curve generation for that object part; and perform a curve inverse kinematics operation to determine the updated effectors for each of the object parts, to update a configuration for the plurality of object parts of the object 200. These one or more animation update steps are animation update steps that (a) include the animation update step at which behaviour(s) is/are determined and behaviour data 810 specifying the determined behaviours is generated and (b) zero or more subsequent animation update steps. Once new behaviour data 810 is generated by the behavior module 802, then the behaviours specified by that new behaviour data 810 may relate to some or all of the same object parts as the previous target data 810 (in which case the behaviours specified by the new behaviour data 810 for these object parts may or may not be the same as the behaviours specified by the previous behaviour data 810 for these object parts) and/or may relate to different object parts from those for the previous target data 810, and the curve generator module 804 will perform its curve generation based, at least in part, on the behaviours specified by the new behaviour data 810.

Curve Types

In the illustrated in FIGS. 5*a* to 5*g*, a simple curve function has been described. Embodiments of the invention are however applicable to any parametric curve, including complex curves.

Figure 12:
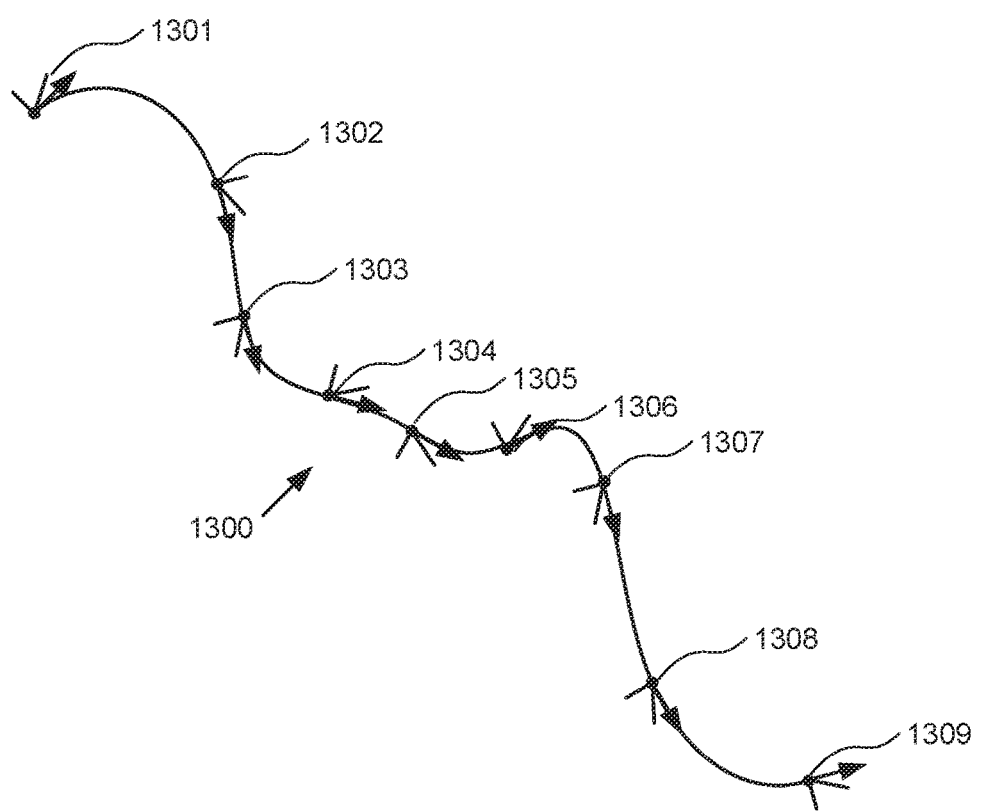
FIG. 12 schematically illustrates a more complex curve used to define the target locations according to an alternative embodiment.

FIG. 12 illustrates a complex curve of an embodiment, in which the curve 1300 is formed from concatenated curve functions indicated by sequential control start points 1301, 1302, 1303, 1304, 1305, 1306, 1307, 1308 and 1309 (the end control point). Intermediate control points (not shown) can also be defined for each curve. The control points can define a rotation or twisting of the function to be applied along the length between control points.

In an alternative embodiment, the curve illustrated in FIG. 12 comprises a single curve function having nine control points illustrated as points 1301, 1302, 1303, 1304, 1305, 1306, 1307, 1308 and 1309 in FIG. 12.

In order to meet the animation requirements of an animator or a program such as a game program, the curve can be acted upon either by acting on the parameters for control points to define a new instantiation of a curve object type or by acting to redefine the curve type.

One aspect provides a non-transient storage medium storing computer code for controlling a computer to carry out the method. Embodiments can be implemented in programmable digital logic that implements computer code. The code can be supplied to the programmable logic, such as a processor or microprocessor, on a carrier medium. The carrier medium is a non-transitory medium that carries or stores the code, such as a solid-state memory, magnetic media (hard disk drive), or optical media (Compact disc (CD) or digital versatile disc (DVD)).

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A computer implemented method for use in animating parts of a virtual object in a virtual world, the method comprising:
    obtaining joint data for each joint of a chain of joints associated with parts of a virtual object, joint data including length data defining a vector length for a vector from the joint to a next joint, the length data corresponding to a length of a part in the virtual world, the joint data for at least one joint including vector constraint data defining a rotational constraint for the vector;
    accessing data for a target curve defining possible target locations for the joints of the parts of the virtual object; and
    processing the joint data to:
        rotate the vector for a joint towards a target location on the curve for a next joint in the chain;
        determine if the vector constraint data for the joint prevents the rotated vector from reaching the target location; and
        if it is determined that the vector constraint data for the joint does not prevent the rotated vector from reaching the target location, rotate the vector for the joint to reach the target location; or
        if it is determined that the vector constraint data for the joint prevents the rotated vector from reaching the target location:
        set the vector angle for the joint at an angle dependent on the rotational constraint; and
        rotate an immediately preceding joint in the chain to move the vector for the joint towards the target location on the curve.

2. A method according to claim 1, wherein the setting and rotating are performed recursively to joint data for successively preceding joints in the chain until the vector for the joint reaches the target location on the curve for a next joint in the chain.

3. A method according to claim 2, wherein a combined vector is determined for a preceding joint in the chain as a vector sum of the vector for the joint, the vector for the preceding joint and vectors for the or each joint between the joint and the preceding joint, a residual angle is determined for the rotation of the combined vector to reach the target location on the curve for the next joint in the chain, and the preceding joint in the chain is rotated by the residual angle to move the vector for the joint towards the target location on the curve.

4. A method according to claim 1, wherein a combined vector is determined as a vector sum of the vector for the joint and the vector for the immediately preceding joint, a residual angle is determined for the rotation of the combined vector to reach the target location on the curve for the next joint in the chain, and the immediately preceding joint in the chain is rotated by the residual angle to move the vector for the joint towards the target location on the curve.

5. A method according to claim 1, wherein processing of the joint data is performed recursively for each joint along the chain.

6. A computer system for use in animating parts of a virtual object in a virtual world, the computer system comprising:
    a program memory storing program code; and
    a processor for implementing the program code stored in the program memory;
    wherein the program code comprises:
    code for controlling the processor to obtain joint data for each joint of a chain of joints associated with parts of a virtual object, joint data including length data defining a vector length for a vector from the joint to a next joint, the length data corresponding to a length of a part in the virtual world, the joint data for at least one joint including vector constraint data defining a rotational constraint for the vector;
    code for controlling the processor to access data for a target curve defining possible target locations for the joints of the parts of the virtual object; and
    code for controlling the processor to process the joint data to:
        rotate the vector for a joint towards a target location on the curve for a next joint in the chain;
        determine if the vector constraint data for the joint prevents the rotated vector from reaching the target location; and
        if it is determined that the vector constraint data for the joint does not prevent the rotated vector from reaching the target location, rotate the vector for the joint to reach the target location; or
        if it is determined that the vector constraint data for the joint prevents the rotated vector from reaching the target location:
        set the vector angle for the joint at an angle dependent on the rotational constraint; and
        rotate an immediately preceding joint in the chain to move the vector for the joint towards the target location on the curve.

7. A system according to claim 6, wherein the code for controlling the processor includes code for controlling the processor to perform the setting and rotating recursively to joint data for successively preceding joints in the chain until the vector for the joint reaches the target location on the curve for a next joint in the chain.

8. A system according to claim 7, wherein the code for controlling the processor includes:
    code for controlling the processor to determine a combined vector for a preceding joint in the chain as a vector sum of the vector for the joint, the vector for the preceding joint and vectors for the or each joint between the joint and the preceding joint, code for controlling the processor to determine a residual angle for the rotation of the combined vector to reach the target location on the curve for the next joint in the chain, and code for controlling the processor to rotate the preceding joint in the chain by the residual angle to move the vector for the joint towards the target location on the curve.

9. A system according to claim 6, wherein the code for controlling the processor includes:

code for controlling the processor to determine a combined vector as a vector sum of the vector for the joint and the vector for the immediately preceding joint, code for controlling the processor to determine a residual angle for the rotation of the combined vector to reach the target location on the curve for the next joint in the chain, and code for controlling the processor to rotate the immediately preceding joint in the chain by the residual angle to move the vector for the joint towards the target location on the curve.

10. A system according to claim 6, including code for controlling the processor to process the joint data recursively for each joint along the chain.

11. A non-transient storage medium storing computer code for controlling a computer to:

obtain joint data for each joint of a chain of joints associated with parts of a virtual object, joint data including length data defining a vector length for a vector from the joint to a next joint, the length data corresponding to a length of a part in the virtual world, the joint data for at least one joint including vector constraint data defining a rotational constraint for the vector;

access data for a target curve defining possible target locations for the joints of the parts of the virtual object; and process the joint data to:

rotate the vector for a joint towards a target location on the curve for a next joint in the chain;

determine if the vector constraint data for the joint prevents the rotated vector from reaching the target location; and if it is determined that the vector constraint data for the joint does not prevent the rotated vector from reaching the target location, rotate the vector for the joint to reach the target location; or if it is determined that the vector constraint data for the joint prevents the rotated vector from reaching the target location:

set the vector angle for the joint at an angle dependent on the rotational constraint; and rotate an immediately preceding joint in the chain to move the vector for the joint towards the target location on the curve.

12. A non-transient storage medium according to claim 11, storing computer code for controlling a computer to perform the setting and rotating recursively to joint data for successively preceding joints in the chain until the vector for the joint reaches the target location on the curve for a next joint in the chain.

13. A non-transient storage medium according to claim 12, storing computer code for controlling a computer to determine a combined vector for a preceding joint in the chain as a vector sum of the vector for the joint, the vector for the preceding joint and vectors for the or each joint between the joint and the preceding joint, to determine a residual angle for the rotation of the combined vector to reach the target location on the curve for the next joint in the chain, and to rotate the preceding joint in the chain by the residual angle to move the vector for the joint towards the target location on the curve.

14. A non-transient storage medium according to claim 11, storing computer code for controlling a computer to determine a combined vector as a vector sum of the vector for the joint and the vector for the immediately preceding joint, to determine a residual angle for the rotation of the combined vector to reach the target location on the curve for the next joint in the chain, and to rotate the immediately preceding joint in the chain by the residual angle to move the vector for the joint towards the target location on the curve.

15. A non-transient storage medium according to claim 11, storing computer code for controlling a computer to process the joint data recursively for each joint along the chain.

* * * * *